United States Patent
Lim et al.

(10) Patent No.: US 9,940,491 B2
(45) Date of Patent: Apr. 10, 2018

(54) LOCATION TRACKING SYSTEM

(71) Applicant: ASCENT SOLUTIONS PTE LTD, Singapore (SG)

(72) Inventors: Chee Kean Lim, Singapore (SG); Kia Boon Chew, Singapore (SG); Pui Lan Pauline Margaret Chung, Singapore (SG)

(73) Assignee: ASCENT SOLUTIONS PTE LTD, Singapore (SG)

( * ) Notice: Subject to any disclaimer, the term of this patent is extended or adjusted under 35 U.S.C. 154(b) by 0 days.

(21) Appl. No.: 15/112,169

(22) PCT Filed: Nov. 9, 2015

(86) PCT No.: PCT/SG2015/050439
§ 371 (c)(1),
(2) Date: Jul. 16, 2016

(87) PCT Pub. No.: WO2017/082812
PCT Pub. Date: May 18, 2017

(65) Prior Publication Data
US 2017/0262668 A1 Sep. 14, 2017

(51) Int. Cl.
*G06F 17/00* (2006.01)
*G06K 7/10* (2006.01)
(Continued)

(52) U.S. Cl.
CPC .......... *G06K 7/10297* (2013.01); *G01S 19/13* (2013.01); *G06K 19/07758* (2013.01); *H04W 4/008* (2013.01)

(58) Field of Classification Search
CPC .......... G06F 17/00; G06F 7/00; G06K 19/00; G06K 7/10; G06K 9/22
(Continued)

(56) References Cited

U.S. PATENT DOCUMENTS 6,717,516 B2   4/2004  Bridgelall
8,611,321 B2  12/2013  Herrala et al.
(Continued)

FOREIGN PATENT DOCUMENTS

WO      2015149107 A1   10/2015

OTHER PUBLICATIONS

Foreign Communication From a Related Counterpart Application, International Search Report and Written Opinion dated Dec. 21, 2015, International Application No. PCT/SG2015/050439 filed on Nov. 9, 2015.
(Continued)

*Primary Examiner* — Edwyn Labaze

(57) ABSTRACT

A location tracking system includes a tag configured to be uniquely associated with and affixed to an item, and automatically and periodically emit a first signal, a receiving transmitter having a Bluetooth signal reception functionality that is configured to automatically receive the first signal from the tag when the receiving transmitter is within a broadcast range of the tag without requiring pairing of the receiving transmitter and the tag and transmit a second signal, and a data system configured to be remotely accessible to the receiving transmitter and receive the second signal transmitted from the receiving transmitter. The second signal can be transmitted via a network to which the receiving transmitter is connected. An application can be installed in the receiving transmitter that allows the receiving transmitter to automatically receive the first signal and initiate transmission of the second signal from the receiving transmitter to the data system.

12 Claims, 4 Drawing Sheets

(51) Int. Cl.
*G06K 19/077* (2006.01)
*H04W 4/00* (2018.01)
*G01S 19/13* (2010.01)

(58) Field of Classification Search
USPC .............. 235/375, 487, 472.02, 462.46, 376
See application file for complete search history.

(56) References Cited

U.S. PATENT DOCUMENTS

| | | |
|---|---|---|
| 2012/0239493 A1 | 9/2012 | Zughaib et al. |
| 2014/0018001 A1 | 1/2014 | Nakra et al. |
| 2014/0145828 A1 | 5/2014 | Bassan-Eskenazi et al. |
| 2015/0002274 A1 | 1/2015 | Sengstaken, Jr. |
| 2015/0046205 A1 | 2/2015 | Muirhead |
| 2015/0130593 A1 | 5/2015 | Mats et al. |
| 2015/0134552 A1* | 5/2015 | Engels .............. G06Q 30/0185 705/318 |
| 2016/0055360 A1* | 2/2016 | Haugarth ........... G06Q 30/0201 340/10.1 |
| 2016/0239796 A1* | 8/2016 | Grant .................... G06Q 30/06 |

OTHER PUBLICATIONS

Foreign Communication From a Related Counterpart Application, International Preliminary Report on Patentability dated May 6, 2016, International Application No. PCT/SG2015/050439 filed on Nov. 9, 2015.
Foreign Communication From a Related Counterpart Application, European Supplemental Search Report dated Jan. 26, 2017, EP Application No. 15876395.3.

* cited by examiner

LOCATION TRACKING SYSTEM

CROSS-REFERENCE TO RELATED APPLICATIONS

The present application is a filing under 35 U.S.C. 371 as the National Stage of International Application No. PCT/SG2015/050439, filed Nov. 9, 2015, entitled "LOCATION TRACKING SYSTEM," which is incorporated herein by reference in its entirety for all purposes

FIELD OF THE INVENTION

This invention relates to a location tracking system, and in particular to a location tracking system for location tracking of items such as cargo, persons and assets.

BACKGROUND OF THE INVENTION

Currently, one of the ways to perform location tracking of items such as cargo, persons and assets comprises affixing an active beaconing tag to the item to be tracked, and deploying proprietary readers at key locations to read signals emitted by the active tag. The proprietary readers then transmit the signals to a data system. The active tag typically comprises a sensor that includes a microcontroller, transceiver, sensor chip, and power supply/harvester that work together under the control of a microcontroller unit that performs all data processing locally as a computation engine. Notably, such tags and readers can be costly to provide, particularly where large numbers of items need to be tracked. Furthermore, as the tag must be within the reading vicinity of a reader in order for its location (corresponding to the reader's location) to be noted, once the item has left the range of a reader, its actual location will not be known until it again comes within the reading range of another reader. During the time when the item is out of range of all readers, its actual location is in fact unknown and the item can become misplaced or stolen. To overcome this problem, it would be desirable to provide as many readers in as many locations as possible in order to minimize the duration where an item is out of range of any reader. However, this is clearly cost prohibitive to implement, particularly in cases where the item is expected to traverses vast distances, and may also be physically next to impossible to provide in many applications.

Another solution is to provide an active beaconing tag that does not rely on readers at key locations for tracking but that directly periodically transmits a signal to a satellite receiver that in turn transmits the signal to a data system. In this way, continual location tracking of the item can be achieved as the satellite receiver is not confined to a specific location, unlike the proprietary readers described above. However, this requires sufficiently low amounts of ambient RF energy in order for the signal sent by the active tag not to suffer from signal interference, and the broadcast signal must also be powerful enough to reach a satellite. Such active tags thereby consume much power, and are accordingly expensive to provide. Such active tags also suffer from scalability issues as it is often impossible to recharge or change the battery of an active tag during transit or storage of the item, in which case the active tag will stop transmitting signals once it is out of power and location tracking of the item will cease to be possible.

SUMMARY OF INVENTION

According to a first aspect, there is provided a location tracking system comprising: a tag configured to be uniquely associated with and affixed to an item, the tag further configured to automatically and periodically emit a first signal, the first signal being a Bluetooth signal configured to be sent and received via a Bluetooth low energy wireless personal area network; a receiving transmitter having a Bluetooth signal reception functionality, the receiving transmitter configured to automatically receive the first signal from the tag when the receiving transmitter is within a broadcast range of the tag without requiring pairing of the receiving transmitter and the tag, the receiving transmitter further configured to transmit a second signal; a data system configured to be remotely accessible to the receiving transmitter and to receive the second signal transmitted from the receiving transmitter, the data system comprising at least one server for executing tasks and a data store connected to the at least one server for data storage, the second signal being transmitted via a network to which the receiving transmitter is connected, the network being at least one of a cellular mobile network and a wireless network; and an application configured to be installed in the receiving transmitter, the application configured to allow the receiving transmitter to automatically receive the first signal and to initiate transmission of the second signal from the receiving transmitter to the data system.

The first signal may comprise information associated with the tag, and wherein the second signal comprises information associated with the receiving transmitter and at least part of the information associated with the tag.

The information associated with the receiving transmitter may include location information of the receiving transmitter, and wherein the information associated with the tag includes information identifying the item to which the tag is affixed.

The receiving transmitter may comprise a mobile phone having a Global Positioning System functionality.

The location tracking system may comprise a plurality of the tag and a plurality of the receiving transmitter.

At least one of the plurality of tags may be configured to receive a signal emitted by at least another one of the plurality of tags.

At least one of the plurality of tags may be configured to be affixed to a static item.

At least one of the plurality of receiving transmitters may be provided at a static location.

The application may be configured to initiate transmission of the second signal from the receiving transmitter to the data system via at least one of: automatic transmission and user-activated transmission.

The application may be configured to allow a user to select one of: automatic transmission and user-activated transmission to initiate transmission of the second signal from the receiving transmitter to the data system.

According to a second aspect, there is provided a collapsible intermediate bulk container comprising: collapsible side walls; and a tag configured to be uniquely associated with and affixed to one of the collapsible side walls, the tag configured to automatically and periodically emit a first signal, the first signal being a Bluetooth signal configured to be sent and received via a Bluetooth low energy wireless personal area network, the tag comprising an accelerometer configured to provide orientation information of the tag, the first signal comprising orientation information of the tag and information identifying the collapsible intermediate bulk container to which the tag is affixed, the first signal configured to be automatically received by a receiving transmitter having a Bluetooth signal reception functionality when the receiving transmitter is within a broadcast range of the tag without requiring pairing of the receiving transmitter and the tag, the receiving transmitter further configured to transmit a second signal, the second signal configured to be received by a data system configured to be remotely accessible to the receiving transmitter and to receive the second signal transmitted from the receiving transmitter, the data system comprising at least one server for executing tasks and a data store connected to the at least one server for data storage, the second signal being transmitted via a network to which the receiving transmitter is connected, the network being at least one of a cellular mobile network and a wireless network, an application configured to be installed in the receiving transmitter being configured to allow the receiving transmitter to automatically receive the first signal and to initiate transmission of the second signal from the receiving transmitter to the data system.

According to a third aspect, there is provided an aircraft cargo pallet comprising: a rectangular frame having four corners; and a tag configured to be uniquely associated with and affixed to the rectangular frame at a recess located at one of the four corners where no cargo or securing device would come into contact with the tag, the tag configured to automatically and periodically emit a first signal, the first signal being a Bluetooth signal configured to be sent and received via a Bluetooth low energy wireless personal area network, the first signal comprising information identifying the air cargo pallet to which the tag is affixed, the first signal configured to be automatically received by a receiving transmitter having a Bluetooth signal reception functionality when the receiving transmitter is within a broadcast range of the tag without requiring pairing of the receiving transmitter and the tag, the receiving transmitter further configured to transmit a second signal, the second signal configured to be received by a data system configured to be remotely accessible to the receiving transmitter and to receive the second signal transmitted from the receiving transmitter, the data system comprising at least one server for executing tasks and a data store connected to the at least one server for data storage, the second signal being transmitted via a network to which the receiving transmitter is connected, the network being at least one of a cellular mobile network and a wireless network, an application configured to be installed in the receiving transmitter being configured to allow the receiving transmitter to automatically receive the first signal and to initiate transmission of the second signal from the receiving transmitter to the data system.

According to a fourth aspect, there is provided a location tracking system for tracking an asset item within a facility, the location tracking system comprising: an item tag configured to be uniquely associated with and affixed to the asset item, the item tag further configured to automatically and periodically emit a first signal, the first signal being a Bluetooth signal configured to be sent and received via a Bluetooth low energy wireless personal area network; a number of location tags, each location tag configured to be uniquely associated with and affixed to each of a number of specific locations within the facility, each location tag further configured to automatically and periodically emit a specific location signal, the specific location signal being a Bluetooth signal configured to be sent and received via a Bluetooth low energy wireless personal area network; at least one receiving transmitter having a Bluetooth signal reception functionality, the at least one receiving transmitter configured to automatically receive the first signal from the item tag when the at least one receiving transmitter is within a broadcast range of the item tag without requiring pairing of the at least one receiving transmitter and the item tag, the at least one receiving transmitter further configured to automatically receive the specific location signal from any one of the number of location tags when the at least one receiving transmitter is within a broadcast range of the one of the number of location tags without requiring pairing of the at least one receiving transmitter and the one of the number of location tags, the at least one receiving transmitter further configured to transmit a second signal; a data system configured to be remotely accessible to the at least one receiving transmitter and to receive the second signal transmitted from the at least one receiving transmitter, the data system comprising at least one server for executing tasks and a data store connected to the at least one server for data storage, the second signal being transmitted via a network to which the at least one receiving transmitter is connected, the network being at least one of a cellular mobile network and a wireless network; and an application configured to be installed in the at least one receiving transmitter, the application configured to allow the at least one receiving transmitter to automatically receive the first signal and to automatically receive the specific location signal and to initiate transmission of the second signal from the at least one receiving transmitter to the data system.

The at least one receiving transmitter may comprise at least one of: a mobile phone having a Global Positioning System functionality and a wireless router.

At least one of the number of location tags may be further configured to receive a signal emitted by at least another one of the number of location tags.

BRIEF DESCRIPTION OF FIGURES

In order that the invention may be fully understood and readily put into practical effect there shall now be described by way of non-limitative example only exemplary embodiments of the present invention, the description being with reference to the accompanying illustrative drawings.

DETAILED DESCRIPTION

Figure 1:
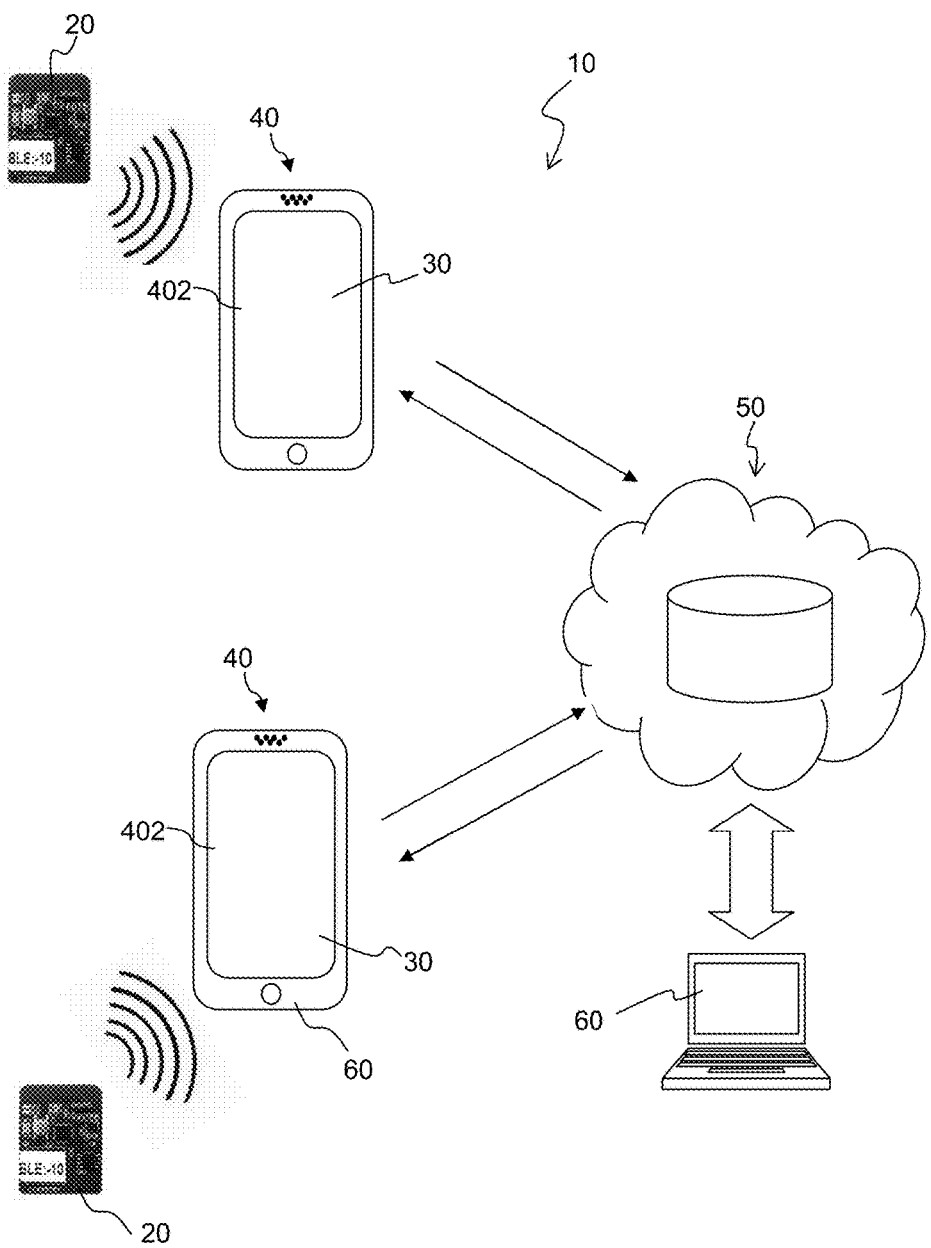
FIG. 1 is a schematic illustration of an exemplary system for location tracking.

Exemplary embodiments of the system 10 for location tracking will be described below with reference to FIGS. 1 to 6, in which the same reference numerals are used to denote the same or similar parts.

As shown in FIG. 1, in general, the location tracking system 10 comprises a number of tags 20, an application 30 configured to be installed in a number of receiving transmitters 40, and at least one data system 50. The number of tags 20 may range from one to a plurality of the tags, and the number of receiving transmitters 40 may range from one to a plurality of the receiving transmitters 40.

Each tag 20 comprises a low-cost active RFID beaconing tag 20 configured to automatically and periodically emit a signal and to have a long battery life, for example from five to seven years, without requiring recharge or battery change. In the preferred embodiment, the signal emitted by the tag 20 is in the Industrial, Scientific and Medical (ISM) 2.4 GHz short-range radio frequency band, commonly known as a Bluetooth signal, that is sent and received via a Bluetooth low energy wireless personal area network (BLE). The tag 20 is preferably powered by a simple and small battery such as a coin cell. Information transmitted with the emitted signal comprises a unique identification number of the tag 20 that has been associated with an item onto which the tag 20 is affixed, and may further comprise any other electronically stored information as may be desired, such as lot or batch number of the item, production date/time of the item, location of the tag 20 for tags 20 that are affixed to a static object, and so on.

Besides automatically and periodically emitting a signal, a tag 20 may further be configured to receive signals emitted from other tags 20, and to include in its emitted signal information not only from itself but also from a signal received from another tag 20. Each tag 20 typically has a broadcast range for its emitted signals comprising a radius ranging from 10 m to 30 m.

Optionally and preferably, the tag 20 is configured to automatically switch off when in flight mode, so that when affixed to an item that will be transported by an aircraft at some point in time, the tag 20 on the item in the aircraft will not interfere with the navigation or communication system of the aircraft. In the preferred embodiment, the tag 20 is sufficiently low in cost, as to be commercially feasible for only one-time or disposable use.

Although the exemplary receiving transmitters 40 that are operable for implementing aspects of the present disclosure are illustrated as mobile phones in FIG. 1, the present disclosure should not be limited to these implementations and each receiving transmitter 40 in which the application 30 is to be installed may take various forms including a smartphone, a tablet, a handheld device, a wearable computing device, a wireless handset, a pager, a personal digital assistant (PDA), a gaming device, a media player, a headset computer, a wireless router or the like. Each receiving transmitter 40 includes a display 402 and a touch-sensitive surface and/or keys for input by a user. Where the receiving transmitter 40 comprises a smart touch-screen mobile phone, it will be understood that the display 402 and touch-sensitive surface are one and the same.

The receiving transmitter 40 may present options for the user to select, controls for the user to actuate, and/or cursors or other indicators for the user to direct. The receiving transmitter 40 may further accept data entry from the user, including numbers to dial or various parameter values for configuring the operation of the handset. The receiving transmitter 40 may further execute one or more software or firmware applications in response to user commands. These applications may configure the receiving transmitter 40 to perform various customized functions in response to user interaction. Additionally, the receiving transmitter 40 may be programmed and/or configured over-the-air, for example from a wireless base station, a wireless access point, or a peer receiving transmitter 40. The receiving transmitter 40 may execute a web browser application which enables the display 402 to show a web page. The web page may be obtained via wireless communications with a base transceiver station, a wireless network access node, a peer receiving transmitter 40 or any other wireless communication network or system.

Figure 2:
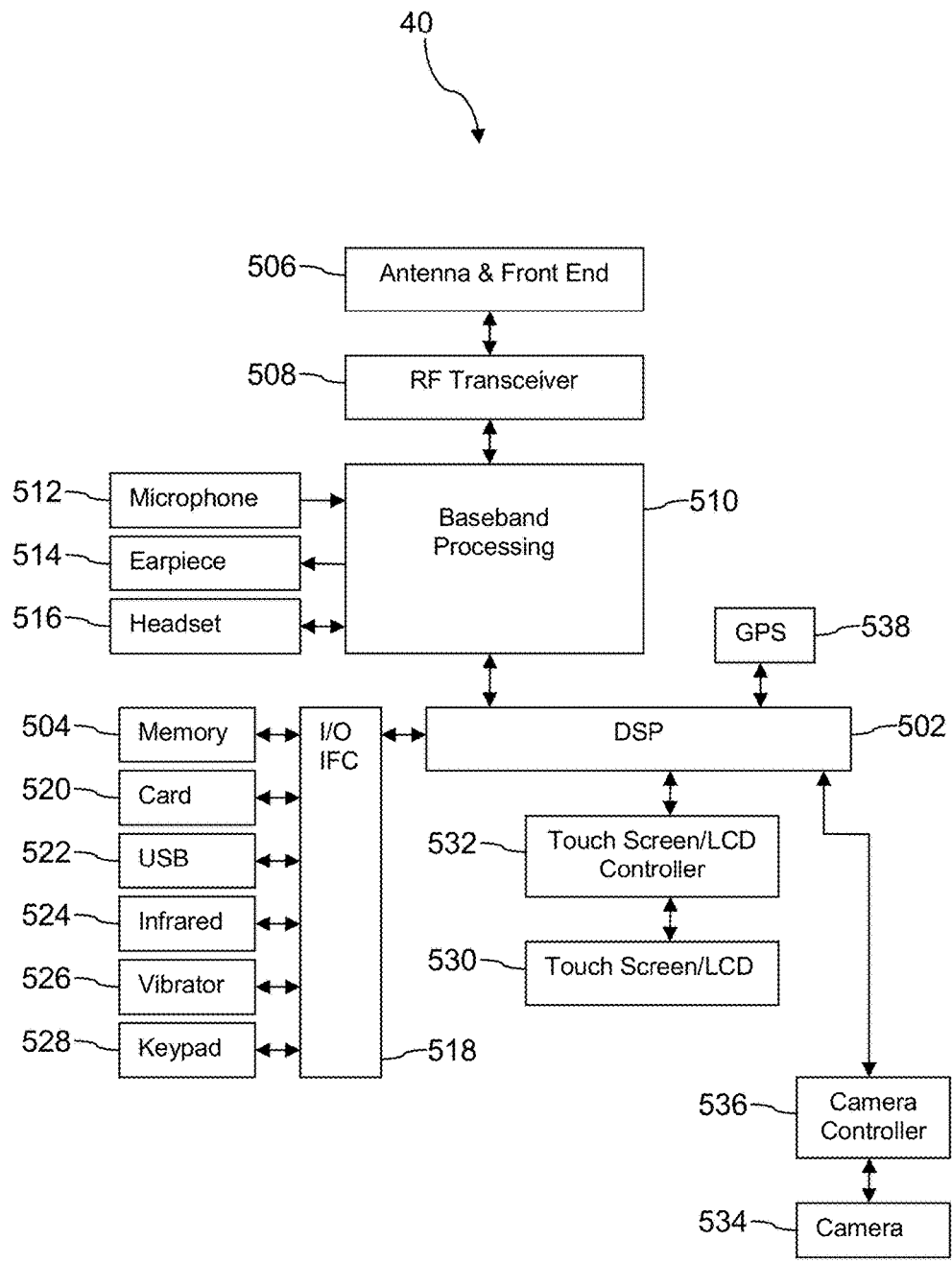
FIG. 2 is a block diagram of a receiving transmitter for installing an application of the system for locating tracking can be installed.

FIG. 2 shows a block diagram of the receiving transmitter 40 configured as a mobile phone. In this embodiment, the application 30 would comprise a mobile application 30 configured to be downloadable and installable in the mobile phone receiving transmitter 40. While a variety of known components of handsets are depicted, in an embodiment a subset of the listed components and/or additional components not listed may be included in the receiving transmitter 40. In an embodiment, the receiving transmitter 40 includes a digital signal processor (DSP) 502 and a memory 504, as well as radio frequency (RF) transceiver 508 configured to receive signals from the active tag 20.

As shown, the receiving transmitter 40 may further include an antenna and front end unit 506, a baseband processing unit 510, a microphone 512, an earpiece and/or speaker 514, a headset port 516, an input/output interface 518, a removable memory card 520, a universal serial bus (USB) port 522, an infrared port 524, a vibrator 526, a keypad 528, a touch screen with a touch sensitive surface 530, a touch screen controller 532, a camera 534, a camera controller 536, a global positioning system (GPS) receiver 538, an accelerometer (e.g., a single or multi axis accelerometer), a gyroscope, and the like. In an embodiment, the receiving transmitter 40 may include another kind of display that does not provide a touch sensitive screen. In an embodiment, the DSP 502 may communicate directly with the memory 504 without passing through the input/output interface 518. Additionally, in an embodiment, the receiving transmitter 40 may comprise other peripheral devices that provide other functionality.

The DSP 502 or some other form of controller or central processing unit operates to control the various components of the receiving transmitter 40 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the receiving transmitter 40 to function as a peripheral device to exchange information with a personal computer or other computer system. The infrared port 524 and other optional ports such as a Bluetooth interface or an IEEE 802.11 compliant wireless interface enable the receiving transmitter 40 to communicate wirelessly with other nearby handsets and/or wireless base stations as well as the active tag 20. In an embodiment, the device 400 may comprise a near field communication (NFC) transceiver. The NFC transceiver may be used to complete payment transactions with point-of-sale terminals or other communications exchanges. In an embodiment, the device 40 may comprise a radio frequency identity (RFID) reader and/or writer device.

The RF transceiver 508 may also be referred to as a radio transceiver, or more concisely, as a radio. While one RF transceiver 508 is illustrated, the receiving transmitter 40 may comprise a plurality of radio transceivers, for example, different RF transceivers 508 associated with different wireless communication protocols and/or different frequency bands. Alternatively, the RF transceiver 508 may be a multi-protocol and/or multi-band RF transceiver.

The keypad 528 couples to the DSP 502 via the input/output interface 518 to provide one mechanism for the user to make selections, enter information, and otherwise provide input to the receiving transmitter 40. Another input mechanism may be the touch screen 530, which may also display text and/or graphics to the user. The touch screen controller 532 couples the DSP 502 to the touch screen 530. The GPS receiver 538 is coupled to the DSP 502 to decode global positioning system signals, thereby enabling the receiving transmitter 40 to determine its position.

Figure 3A:
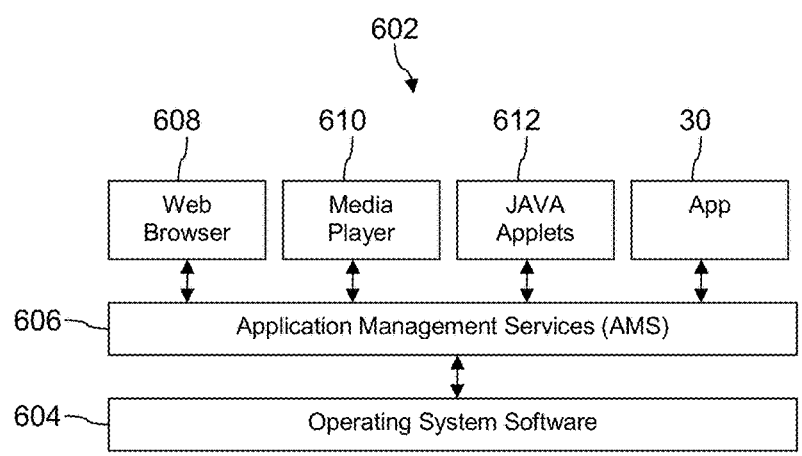
FIG. 3A is an illustration of a software environment that may be implemented by a digital signal processor of the receiving transmitter of FIG. 2.

FIG. 3A illustrates a software environment 602 that may be implemented by the DSP 502. The DSP 502 executes operating system software 604 that provides a platform from which the rest of the software operates. The operating system software 604 may provide a variety of drivers for the handset hardware using interfaces that are accessible to application software. The operating system software 604 may be coupled to and interact with application management services (AMS) 606 that transfer control between applications running on the receiving transmitter 40. Also shown in FIG. 6A are a web browser application 608, a media player application 610, and JAVA applets 612. The web browser application 608 may be executed by the receiving transmitter 40 to browse content and/or the Internet, for example when the receiving transmitter 40 is coupled to a network via a wireless link. The web browser application 608 may permit a user to enter information into forms and select links to retrieve and view web pages. The media player application 610 may be executed by the receiving transmitter 40 to play audio or audiovisual media. The JAVA applets 612 may be executed by the receiving transmitter 40 to provide a variety of functionality including games, utilities, and other functionality.

Figure 3B:
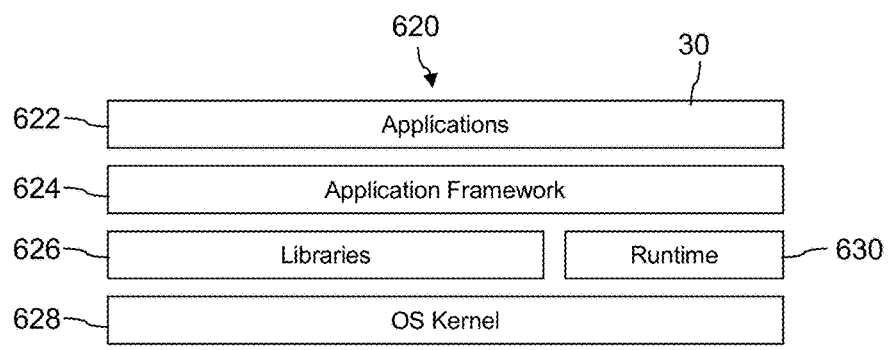
FIG. 3B is an illustration of an alternative software environment that may be implemented by a digital signal processor of the receiving transmitter of FIG. 2.
Figure 5:
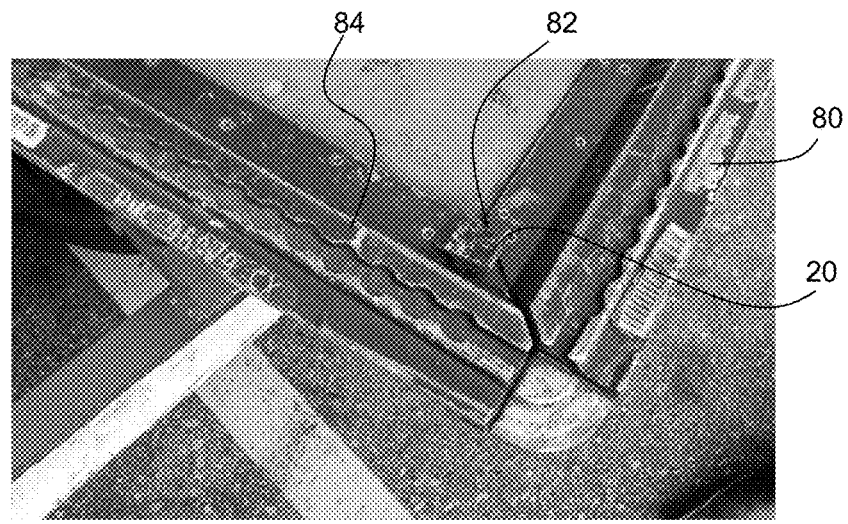
FIG. 5 is a photograph of a tag of the system for location tracking affixed to an aircraft cargo pallet.

FIG. 3B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

In particular, each receiving transmitter 40 is configured to automatically receive signals emitted by any of the number of tags 20 when the receiving transmitter 40 is within the broadcast range of any of the number of tags 20. In this location tracking system 10, no pairing between a receiving transmitter 40 and an emitting tag 20 is required in order for the receiving transmitter 40 to receive the signals emitted by the tag 20. Each receiving transmitter 40 is installed with an application 30 configured for managing information obtained from a signal received from a tag 20. For example, the application 30 may be configured to associate the unique identification number in a signal received from the tag 20 with the receiving transmitter's 40 own present location and identity.

In a preferred embodiment, the application 30 is configured to be downloadable from a digital distribution platform (e.g. App Store™ or Google Play™) for installation in each receiving transmitter 40 via Internet connectivity of the receiving transmitter 40.

As mentioned above, besides the number of tags 20 and receiving transmitters 40, the location tracking system 10 also comprises a data system 50. The data system 50 is configured to be wirelessly or remotely accessible to each of the receiving transmitters 40, and is configured to receive, process and store information that is transmitted in a signal generated by and sent from the number of receiving transmitters 40. Accordingly, the data system 50 comprises at least one server for executing tasks and a data store connected to the at least one server for data storage, so as to form a data communicating system with the number of receiving transmitters 40. For example, the data system 50 may comprise a cloud-based computing system, a web-based portal, a back-end server and the like. In the preferred embodiment, each of the number of receiving transmitters 40 is configured to transmit information to the data system 50 via Internet connectivity.

Information in the signal transmitted from the receiving transmitter 40 to the data system 50 comprises at least part of the information contained in the signal emitted by a tag 20 that has been received by the receiving transmitter 40 when the receiving transmitter 40 is within the broadcast range of the tag 20. Information in the signal transmitted from the receiving transmitter 40 to the data system 50 also further comprises information associated with the receiving transmitter 40 itself. In one embodiment where the receiving transmitters 40 comprise mobile phones, such information may comprise user identity and location information of each mobile phone receiving transmitter 40 obtained via a global positioning system (GPS) functionality of each mobile phone receiving transmitter 40.

In other embodiments where the receiving transmitter 40 is a stationary device, location of the receiving transmitter 40 would have been previously stored with the data system 50 so that this location can be associated with a tag 20 which signal has been received by the receiving transmitter 40.

Thus, when a specific receiving transmitter 40 that is within broadcast range of a particular tag 20 has received a first signal emitted by the particular tag 20, information in the first signal well as location information of the specific receiving transmitter 40 can be transmitted by the receiving transmitter 40 in a second signal to the data system 50, thereby allowing the particular tag 20 to be associated with the location of the specific receiving transmitter 40.

In one embodiment, the application 30 is configured to allow a user of the receiving transmitter 40 to activate transmission of the second signal from the receiving transmitter 40 to the data system 50 via a graphical user interface. In a preferred embodiment, the graphical user interface may be configured as a web portal. Alternatively or in addition, the application may be configured to automatically initiate transmission of the second signal to the data system 50 when the receiving transmitter 40 comes within the broadcast range of a tag 20 and receives the first signal from the tag 20. Where the application 30 is configured to allow both automatic as well as user-activated transmission of the second signal from the receiving transmitter 40 to the data system 50, the application 30 is preferably configured to allow a user to selectably set the application 30 to perform either automatic or user-activated transmission of the second signal from the receiving transmitter 40 to the data system 50.

As one receiving transmitter 40 may be within the broadcast range of a plurality of tags 20 and therefore receives a plurality of signals emitted by the plurality of tags 20, the application 30 may further be configured to allow a user to select which of the plurality of signals the user wishes the receiving transmitter 40 to obtain information from for onward transmission to the data system 40 in the second signal.

In another embodiment, where the application 30 is configured to automatically initiate transmission of the second signal from each of the number of receiving transmitters 40 to the data system 50, the second signal sent to the data system 50 would expectedly contain information obtained from the signals received from all the tags 20 that each receiving transmitter 40 is within the broadcast range of. Under such circumstances, where a particular tag 20 has, for example, two receiving transmitters 40 within its broadcast range, information from the particular tag 20 is sent to the data system 20 by both the two receiving transmitters 40. In order for the data system 50 to determine which receiving transmitter 40 is nearer the particular tag 20, a received signal strength indication (RSSI) may be determined by each receiving transmitter 40 for each signal emitted by a tag 20 that is received by each receiving transmitter 40. The RSSI may thus be also included in the second signal sent to the data system 50. In this way, the RSSI for a particular tag 20 which information was included in the second signals sent by two receiving transmitters 40 may be compared, so that the location of the receiving transmitter 40 that transmitted a higher RSSI may be selected as a closest estimate of the actual location of the particular tag 20.

Importantly, the unique identification number of each tag 20 must have been previously associated with a specific item to which each tag 20 is affixed, thereby creating an association database of unique tag-and-item pairs. This association database is preferably stored and accessible in the data system 50, such that tracking a location of a particular tag 20 is as good as and equivalent to tracking a location of the specific item affixed with that particular tag 20.

In addition, the data system 50 is preferably configured to allow one or more users using a client machine 60 in data communication with the data system 50 to query a status of an item that has been tagged with one of the number of tags 20, in order to determine a last known location of the item, the last known location being indicated by a last one of the number of receiving transmitters 40 to have come within the broadcast range of the tag 20. Besides storing and providing the last known location of an item affixed with a tag 20, the data system 50 is preferably also configured to store and to allow a user to view on the client machine 60 a movement history of the item as previously registered by other receiving transmitters 40 sequentially prior to and leading up to the last known location of the item. Notably, any one of the receiving transmitters 40 may be further configured to function as a client machine 60 in data communication with the data system 50.

As the location tracking system 10 is configurable to perform one or both automatic as well as user-activated transmission of information from one or more receiving transmitters 40 to the data system 50 when the one or more receiving transmitters 40 are within the broadcast range of any number of tags 20, the location tracking system 10 can appreciably be variously and appropriately configured to suit multiple different fields of use of location tracking, as described in greater detail with the examples below.

EXAMPLE 1

Location Tracking of Unit Load Devices (ULD)

Figure 4:
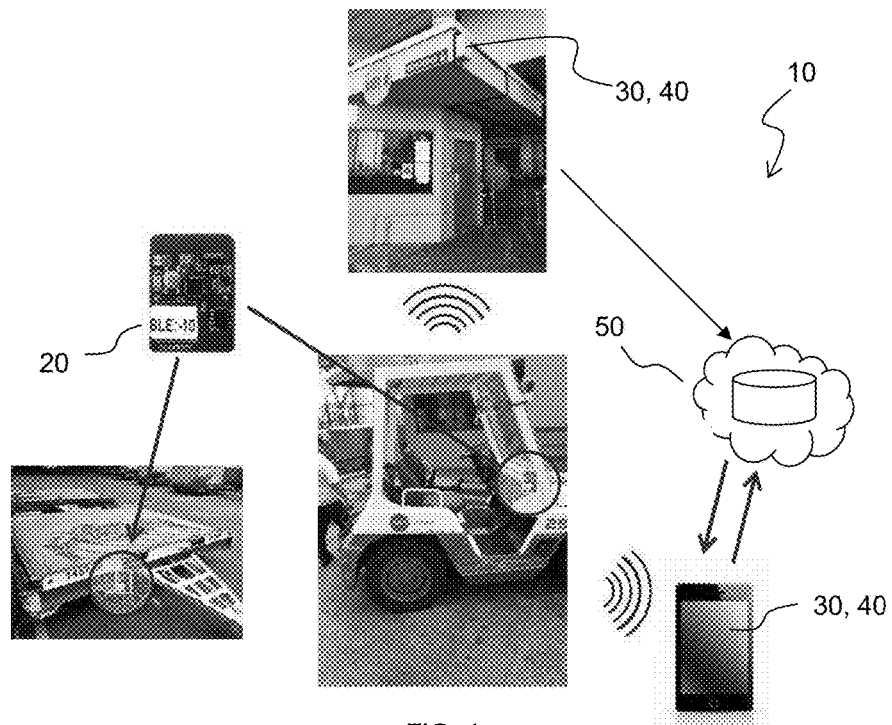
FIG. 4 is an illustration of an example of use of the system of FIG. 1 for location tracking of unit load devices at an airport.

In this example of location tracking of ULDs such as aircraft cargo pallets and containers in air-cargo handling, as depicted in FIG. 4, a unique tag 20 as described above is affixed to each ULD (shown in FIG. 5 as an aircraft cargo pallet) as well as to each dolly used to transport a ULD. On the pallet 80, the tag 20 is affixed to a recessed corner 82 of the frame 84 of the pallet 80 where no cargo or securing device such as netting would come into contact with the tag 20 to dislodge it, thus achieving a safe and secure affixment of the tag 20 to the pallet 80.

Each dolly is configured to be hitched to and pulled by a tractor, and each tractor also has a unique tag 20 affixed thereto. The tractors are operated by drivers who each carry about a receiving transmitter 40 installed with the application 30 described above to communicate with the data system 50. The receiving transmitter 40 carried about by each driver is preferably the driver's personal mobile phone, thereby providing significant cost savings towards implementing the present location tracking system 10 since no additional tag-reading hardware needs to be provided. In this example, the application 30 installed on each driver's mobile phone 40 is configured to require user-activated transmission of the second signal from the mobile phone 40 when the mobile phone has received the first signal from one or more tags 20 that it is within the broadcast range of.

In this example, at a first location, a driver of a tractor uses his mobile phone 40 to scan and register tags 20 individually affixed to a ULD and a dolly on which the ULD is placed, followed by transmitting this information as well as his mobile phone's present location (i.e., the first location). The dolly is hitched to the tractor that is driven together with the dolly and the ULD on the dolly to a second location.

At the second location, the driver again scans and registers the tag 20 on the ULD followed by transmitting this information as well as his mobile phone's present location (i.e., the second location) to the data system 50, thereby confirming delivery of the ULD to the second location. The ULD may then be removed from the dolly by cargo handlers for storage at the second location while awaiting arrival of an aircraft.

Upon eventual loading of the ULD onto the aircraft, in the aircraft, the tag 20 on the ULD may again be scanned and registered by a cargo handler using his mobile phone 40 that has been installed with the application 30, and this information transmitted to the data system 50 to confirm that the ULD is now in the aircraft.

Meanwhile, the driver may have driven the unladen dolly to a dolly parking space and unhitched the dolly from the tractor. At this point, the driver again scans and registers the tag 20 on the dolly and transmits this information to the data system 50 using the application 30 in his mobile phone 40, to record deposit and location of the dolly.

Thereafter, the driver may drive the tractor out of a gated area where the dolly and ULD were handled. At an appropriate location of the gated area, a receiving transmitter 40 installed with the application 30 that is configured to automatically initiate transmission of the second signal from the receiving transmitter 40 to the data system 50. As the tractor is driven past the gate, the receiving transmitter 40 comes within the broadcast range of the tag 20 affixed to the tractor and automatically transmits information obtained from the tag 20 to the data system 50, thereby recording passage of the tractor through the gated area. Thus, one or more units of the receiving transmitter 40 may also be provided at one or more static locations.

As shown through this example, it will be noted that the receiving transmitter 40 of the location tracking system 10 in the form of the driver's mobile phone 40 is not a static tag reader, but is free to be moved about as desired by the user. In this way, even a single receiving transmitter 40 is able to register and record movement of multiple tagged items between multiple locations, since the receiving transmitter 40 already has built-in GPS, Bluetooth scanning and detecting functionality, and Internet connectivity, and can communicate with the data system 50 from any possible location where it has reception. Accordingly, significant cost savings can be achieved when the location tracking system 10 comprises only a number of unique tags 20 to be affixed to items, and copies of the application 30 installed into existing mobile phones 40 of users to be ready for implementation, without requiring further hardware modifications or dedicated tag-reading hardware to be provided. At the same time, the tags 20 do not require high power as they do not need to transmit signals for long distances in order to reach satellite readers. Instead, the receiving transmitters 40 that are installed with the applications 30 can be readily charged whenever their battery levels are low. In this way, there is little fear of the tags 20 running out of battery and their affixed items getting lost because the tags 20 can no longer emit signals to indicate their presence.

Appreciably, when a number of receiving transmitters 40 are installed with the application 30 and configured to be receive signals emitted by tags 20 when within the broadcast range of these tags 20, as exemplified in the above description where the tractor driver, the cargo handler and the aircraft personnel each have their own mobile phones 40 configured as one of the number of receiving transmitters 40 of the present location tracking system 10, a robust and highly detailed location tracking network can be formed, as each of the receiving transmitters 40 is free-ranging and able to receive a signal from a tagged item 20 that it is within broadcast range of, wherever the tagged item 20 may be, without requiring the tagged item 20 to be registered only when it reaches specific fixed locations where a dedicated tag-reader is provided.

EXAMPLE 2

Location Tracking of Persons within a Facility

Figure 6:
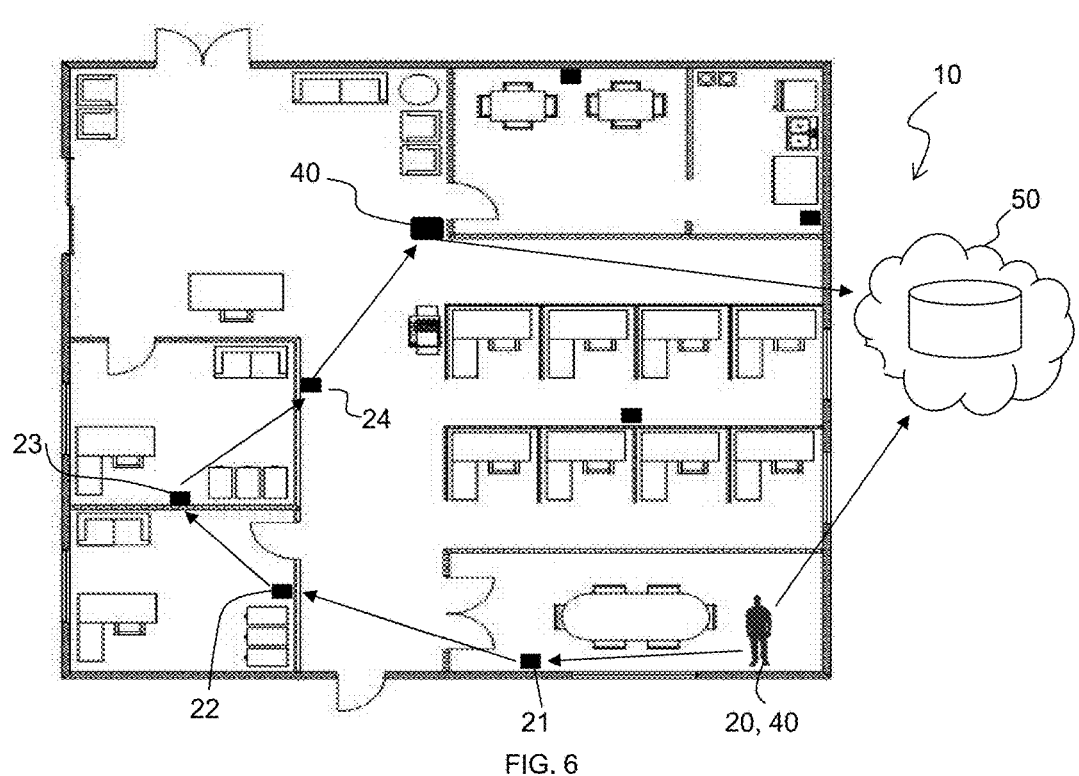
FIG. 6 is an illustration of an example of use of the system of FIG. 1 for location tracking of a person in a facility.

In this example of location tracking of persons within a facility, as shown in FIG. 6, each person has a receiving transmitter 40 comprising their personal mobile phone 40 that is installed with the application 30 of the location tracking system 10. The application 30 is configured to automatically receive signals from tags 20 that it comes within broadcast range of, and to transmit the unique tag information to the data system 50.

In this example, each previously designated area (such as each room within the facility) is installed with and associated with a unique tag 21 that automatically and periodically emits a signal. When a person carrying the mobile phone 40 enters a room, the mobile phone 40 of that person comes within the broadcast range of the tag 21 in that room, automatically receives the signal emitted by the tag 21, and automatically transmits information in the received signal to the data system 50.

In this example, GPS functionality of the receiving transmitter 40 is not utilized since the tag 21 already identifies the location within the facility. Thus, the location of the person having the receiving transmitter 40 is that of the particular tagged room of the facility. In this way, battery consumption of the receiving transmitter 40 in this implementation of the location tracking system 10 is reduced when compared to requiring each receiving transmitter 40 to be continually having its GPS functionality turned on in order to continually tracked for location via GPS.

To further enhance robustness in this example, a person to be tracked may also be provided with a tag 20 in addition to or in place of his or her own receiving transmitter 40. As mentioned above, a tag 20 can be configured to not only transmit signals, but also receive signals emitted by other tags 20. To illustrate such use, continuing with the present example, as can be seen in FIG. 6, the locator tag 21 that is installed in a room is able to receive an emitted signal from a tag 20 that is provided on a person within the broadcast range of the locator tag 21. The locator tag 21 in turn transmits a signal to an intermediate tag 22 provided at another location that is within broadcast range of the locator tag 21. The transmitted signal comprises identity information obtained from the tag 20 on the person as well as location information of the locator tag 21. This signal is transmitted onward to further tags 23, 24 installed elsewhere in the facility where applicable, to provide a backhaul function to a receiving transmitter 40, such as a wireless router, for transmission of the signal to the data system 50. Thus, a plurality of tags comprising, for example, the locator tag 21, the intermediate tag 22 and the further tags 23, 24 may together function as a BLE mesh to provide the backhaul function of relaying location information of the tag 20 on the person to the receiving transmitter 40 and from thereon to the data system 50.

It should be noted that the above described example may also be applied to location tracking of asset items (instead of persons) within a facility, by affixing a tag 20 to each asset item to be tracked, and utilizing the BLE mesh to relay location information of the tag 20 on the asset item to the receiving transmitter 40 and from thereon to the data system 50.

EXAMPLE 3

Location Tracking of Assets

In this example of location tracking of assets, each asset item is tagged and associated with a tag 20 of the location tracking system 10. Typically, it is expected that each asset item is often moved about, such as individual animals among free-range livestock, pieces of portable medical equipment in hospitals such as bedside monitors and anaesthetic machines, office assets such as computers and peripheral devices, for example.

In this example, a number of receiving transmitters 40 installed with the application 30 that is configured for automatic receiving of signals from tags 20 and automatic transmission of information to the data system 50 are provided at key locations where each asset item may be expected to be found. In addition, the application 30 may also be installed in the personal mobile phones 40 of persons working with the asset items, such as a livestock handler, a nurse or medical orderly.

In this way, wherever the broadcast range of a tagged asset item reaches a specific one of the number of receiving transmitters 40 that are provided about the facility, the application 30 in that specific receiving transmitter 40 automatically receives and transmits information of the tag 20 as well as location of the specific receiving transmitter 40 to the data system 50 to record the location of the tagged asset item. In addition, where the receiving transmitters 40 that have been provided at the key locations are not within the broadcast range of a particular tagged asset item, location of the particular tagged asset item can still be determined simply by a person working with the particular tagged asset item receiving its emitted signal with their mobile phone 40 that has been installed with the application 30, and transmitting this information together with the location of their mobile phone 40 to the data system 50. In the mobile phones 40 of the persons who work with the asset items, the application 30 can be configured to be selectable to either automatically or user-activatedly transmit information to the data system 50. In this way, the application 30 can be customized to specifically suit the needs of the users of the location tracking system 10.

EXAMPLE 4

Location Tracking of Collapsible Intermediate Bulk Containers (IBC)

In this example, collapsible intermodal bulk containers (IBC) are each affixed with a tag 20 of the present location tracking system 10 such that the tag 20 is able to sense when an IBC is not in use and in a storage state with its side walls collapsed for saving space. This is achieved by configuring each tag 20 to comprise an accelerometer and affixing the tag 20 to one of the collapsible side walls, so that the accelerometer is able to provide orientation information of the tag 20. In this embodiment, the signal that is automatically and periodically emitted by the tag 20 comprises orientation information of the tag 20 as well as identification of the IBC to which the tag 20 is attached. A specific orientation of the tag 20 can be associated with a specific state of the IBC, so that the signal that is emitted by the tag 20 also indicates whether the IBC is in a usage or a storage state. As a collapsible IBC would normally be in a usage state only when it is laden and in a storage state when unladen, the orientation information can thus also be used as an indication of whether the collapsible IBC is laden or unladen. The orientation information and IBC identification can then be transmitted by a receiving transmitter 40 to the data system 50 and associated with the location information of the receiving transmitter 40. In this way, location as well as the state of each IBC can be tracked using the location tracking system 10.

In addition to the examples given above, it will be understood that the location tracking system 10 can be readily configured for many other applications.

A further example is the tracking of trans-shipment or transit cargo, in which high priority cargo on very short transit times or all transit cargo are tagged for easy traceability and optimal use of storage/staging space at airport warehouses, and configuring the data system 50 and application 30 to trigger an automatic alert when location of the tagged item has not been updated within a user-specified duration under certain conditions.

Another example is in tracking of items in consolidated cargo, which refers to sub-container tracking of tagged items originating at source or consolidation center in which tracking is carried out within the source and consolidation location until departure for its destination. At the deconsolidation centre, if further tracking is required, service staff may simply download the application 30 onto their personal mobile phones 40 (if not already installed) to receive the signal emitted by a tagged item and transmit this information to the data system 50.

Other examples of use of the location tracking system 10 include other conceivable airport terminal location-based service applications such as tracking of passenger baggage trolleys and wheelchairs, tracking of miners and equipment in coal mines, hospital asset and staff tracking and contact tracing, customer and product profiling and advertising. In one of its many possible configurations, the location tracking system 10 is also capable of functioning as a backhaul device to transmit data to a cloud computing system, an example of which has been described above in Example 2.

Whilst there has been described in the foregoing description exemplary embodiments of the present invention, it will be understood by those skilled in the technology concerned that many variations in details of design, construction and/or operation may be made without departing from the present invention. For example, while the examples mentioned above describe the use of multiple tags and receiving transmitters, the location tracking system 10 may comprise only one tag 20 and one receiving transmitter 40, depending on the needs of the application for which a user is implementing the location tracking system 10.

The invention claimed is:

1. A location tracking system comprising:
a tag configured to be uniquely associated with and affixed to an item, the tag further configured to automatically and periodically emit a first signal, the first signal being a Bluetooth signal configured to be sent and received via a Bluetooth low energy wireless personal area network;
a receiving transmitter having a Bluetooth signal reception functionality, the receiving transmitter configured to automatically receive the first signal from the tag when the receiving transmitter is within a broadcast range of the tag without requiring pairing of the receiving transmitter and the tag, the receiving transmitter further configured to transmit a second signal;
a data system configured to be remotely accessible to the receiving transmitter and to receive the second signal transmitted from the receiving transmitter, the data system comprising at least one server for executing tasks and a data store connected to the at least one server for data storage, the second signal being transmitted via a network to which the receiving transmitter is connected, the network being at least one of a cellular mobile network and a wireless network; and
an application configured to be installed in the receiving transmitter, the application configured to allow the receiving transmitter to automatically receive the first signal and to initiate transmission of the second signal from the receiving transmitter to the data system;
wherein the location tracking system comprises a plurality of the tags and a plurality of the receiving transmitters, and wherein at least one of the plurality of tags is configured to receive a signal emitted by at least another one of the plurality of tags.

2. The location tracking system of claim 1, wherein the first signal comprises information associated with the tag, and wherein the second signal comprises information associated with the receiving transmitter and at least part of the information associated with the tag.

3. The location tracking system of claim 2, wherein the information associated with the receiving transmitter includes location information of the receiving transmitter, and wherein the information associated with the tag includes information identifying the item to which the tag is affixed.

4. The location tracking system of claim 1, wherein the receiving transmitter comprises a mobile phone having a Global Positioning System functionality.

5. The location tracking system of claim 1, wherein at least one of the plurality of tags is configured to be affixed to a static item.

6. The location tracking system of claim 1, wherein at least one of the plurality of receiving transmitters is provided at a static location.

7. The location tracking system of claim 1, wherein the application is configured to initiate transmission of the second signal from the receiving transmitter to the data system via at least one of: automatic transmission and user-activated transmission.

8. The location tracking system of claim 7, wherein the application is configured to allow a user to select one of: automatic transmission and user-activated transmission to initiate transmission of the second signal from the receiving transmitter to the data system.

9. The location tracking system of claim 1, wherein the item is an aircraft cargo pallet comprising:
a rectangular frame having four corners;
wherein the tag is affixed to the rectangular frame at a recess located at one of the four corners where no cargo or securing device would come into contact with the tag, and
wherein the first signal comprises information identifying the air cargo pallet to which the tag is affixed.

10. A collapsible intermediate bulk container comprising:
collapsible side walls; and
a tag configured to be uniquely associated with and affixed to one of the collapsible side walls, the tag configured to automatically and periodically emit a first signal, the first signal being a Bluetooth signal configured to be sent and received via a Bluetooth low energy wireless personal area network, the tag comprising an accelerometer configured to provide orientation information of the tag, the first signal comprising orientation information of the tag and information identifying the collapsible intermediate bulk container to which the tag is affixed;
the first signal configured to be automatically received by a receiving transmitter having a Bluetooth signal reception functionality when the receiving transmitter is within a broadcast range of the tag without requiring pairing of the receiving transmitter and the tag, the receiving transmitter further configured to transmit a second signal;
the second signal configured to be received by a data system configured to be remotely accessible to the receiving transmitter and to receive the second signal transmitted from the receiving transmitter, the data system comprising at least one server for executing tasks and a data store connected to the at least one server for data storage, the second signal being transmitted via a network to which the receiving transmitter is connected, the network being at least one of a cellular mobile network and a wireless network;
an application configured to be installed in the receiving transmitter being configured to allow the receiving transmitter to automatically receive the first signal and to initiate transmission of the second signal from the receiving transmitter to the data system.

11. A location tracking system for tracking an asset item within a facility, the location tracking system comprising:
an item tag configured to be uniquely associated with and affixed to the asset item, the item tag further configured to automatically and periodically emit a first signal, the first signal being a Bluetooth signal configured to be sent and received via a Bluetooth low energy wireless personal area network;
a number of location tags, each location tag configured to be uniquely associated with and affixed to each of a number of specific locations within the facility, each location tag further configured to automatically and periodically emit a specific location signal, the specific location signal being a Bluetooth signal configured to be sent and received via a Bluetooth low energy wireless personal area network;
at least one receiving transmitter having a Bluetooth signal reception functionality, the at least one receiving transmitter configured to automatically receive the first signal from the item tag when the at least one receiving transmitter is within a broadcast range of the item tag without requiring pairing of the at least one receiving transmitter and the item tag, the at least one receiving transmitter further configured to automatically receive the specific location signal from any one of the number of location tags when the at least one receiving transmitter is within a broadcast range of the one of the number of location tags without requiring pairing of the at least one receiving transmitter and the one of the number of location tags, the at least one receiving transmitter further configured to transmit a second signal;
a data system configured to be remotely accessible to the at least one receiving transmitter and to receive the second signal transmitted from the at least one receiving transmitter, the data system comprising at least one server for executing tasks and a data store connected to the at least one server for data storage, the second signal being transmitted via a network to which the at least one receiving transmitter is connected, the network being at least one of a cellular mobile network and a wireless network; and
an application configured to be installed in the at least one receiving transmitter, the application configured to allow the at least one receiving transmitter to automatically receive the first signal and to automatically receive the specific location signal and to initiate transmission of the second signal from the at least one receiving transmitter to the data system;
wherein at least one of the number of location tags is further configured to receive a signal emitted by at least another one of the number of location tags.

12. The location tracking system of claim 11, wherein the at least one receiving transmitter comprises at least one of: a mobile phone having a Global Positioning System functionality and a wireless router.

* * * * *